United States Patent [19]

Shimada et al.

[11] Patent Number: 4,802,892
[45] Date of Patent: Feb. 7, 1989

[54] FUEL OIL ADDITIVE AND FUEL OIL HAVING IMPROVED FLOWABILITY

[75] Inventors: Takeo Shimada; Tsutomu Isaka; Noriyuki Okada; Iwao Ishino; Nobuhiro Usami, all of Mie, Japan

[73] Assignee: Mitsubishi Petrochemical Co., Ltd., Tokyo, Japan

[21] Appl. No.: 908,797

[22] Filed: Sep. 18, 1986

[30] Foreign Application Priority Data

Sep. 24, 1985 [JP] Japan .................. 60-210805

[51] Int. Cl.⁴ .............................................. C10L 1/18
[52] U.S. Cl. ............................................ 44/62; 44/70
[58] Field of Search .......................................... 44/62

[56] References Cited

U.S. PATENT DOCUMENTS

| | | | |
|---|---|---|---|
| 3,642,459 | 2/1972 | Ilnyckyj | 44/62 |
| 3,726,653 | 4/1973 | Van der Meij et al. | 44/62 |
| 3,790,359 | 2/1974 | Feldman | 44/62 |
| 3,792,983 | 2/1974 | Tunkel et al. | 44/62 |
| 3,862,825 | 1/1975 | Sweeney | 44/62 |
| 3,961,916 | 6/1976 | Ilnyckyj | 44/62 |
| 3,981,850 | 9/1976 | Wisotsky et al. | 44/62 |
| 4,087,255 | 5/1978 | Wisotsky et al. | 44/62 |
| 4,156,434 | 5/1979 | Parker et al. | 44/62 |
| 4,211,534 | 7/1980 | Feldman | 44/62 |
| 4,261,703 | 4/1981 | Jack et al. | 44/62 |
| 4,365,973 | 12/1982 | Irish | 44/62 |
| 4,404,000 | 9/1983 | Toyoshima et al. | 44/62 |
| 4,474,578 | 10/1984 | Comils et al. | 44/62 |
| 4,481,013 | 11/1984 | Jack et al. | 44/62 |
| 4,569,679 | 2/1986 | Rossi | 44/62 |
| 4,595,395 | 6/1986 | Smith | 44/62 |

FOREIGN PATENT DOCUMENTS

| | | |
|---|---|---|
| 45342 | 2/1982 | European Pat. Off. |
| 61894 | 10/1982 | European Pat. Off. |
| 74208 | 3/1983 | European Pat. Off. |
| 84148 | 7/1983 | European Pat. Off. |
| 113581 | 7/1984 | European Pat. Off. |
| 1593672 | 7/1981 | United Kingdom |

OTHER PUBLICATIONS

*Chemical Abstracts*, vol. 103, No. 16, Oct. 1985, p. 170.
*Chemical Abstracts*, vol. 96, No. 10, Mar. 1982, p. 171.

Primary Examiner—William R. Dixon, Jr.
Assistant Examiner—Ellen McAvoy
Attorney, Agent, or Firm—Oblon, Fisher, Spivak, McClelland & Maier

[57] ABSTRACT

As a fuel oil additive, an ethylenic copolymer is provided which is derived from:
(a) ethylene, and
(b) at least one monomer selected from the group consisting of vinyl esters of saturated carboxylic acids, ethylenically unsaturated mono- or di-carboxylic acids and esters thereof which are represented by the general formula:

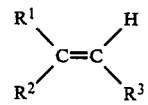

wherein $R^1$ represents hydrogen or a methyl group, $R^2$ represents the group $-OCOR^4$ or $-COOR^4$ in which $R^4$ represents hydrogen or an alkyl group having 1 to 18 carbon atoms, and $R^3$ represents hydrogen or the group $-COOR^4$ in which $R^4$ has the same significance as above, having a number average molecular weight of less than 1,000 and a (b) component content of 1 to 25 mol %, and containing 2 to 10 alkyl branches per 100 methylene groups. Addition of the copolymer to a fuel oil provides a modified fuel oil having improved plugging resistance and having improved flowability.

9 Claims, No Drawings

FUEL OIL ADDITIVE AND FUEL OIL HAVING IMPROVED FLOWABILITY

FIELD OF THE INVENTION

This invention relates to an additive for a fuel oil, and to a fuel oil containing the aforesaid additive. More specifically, it relates to an additive for reducing cold plugging of a middle distillate fuel oil having a boiling range of 120° to 500° C. with the difference between a 20% distillation temperature and a 90% distillation temperature being as narrow as less than 100° C., and to a fuel oil containing the aforesaid additive and having improved flowability.

BACKGROUND OF THE INVENTION

When such a fuel oil as described above is exposed to low temperatures, the wax component of the oil precipitates as crystals. Thus, if it is used as a fuel for a Diesel engine, it causes filter plugging. This causes poor operation of the engine, or in an extreme case, the oil solidifies within the fuel pipe and completely fails to flow.

In order to solve this problem, various wax crystal modifying agents (improvers) which interact with the wax crystals have previously been proposed. As such crystal modifying agents, Japanese Patent Publication No. 23165/73, for example, teaches the use of an ethylene copolymer having a number average molecular weight of 1,000 to 2,900 and containing 2.4 to 25 mol % of an ethylenically unsaturated ester and not more than 6 alkyl branches per 100 methylene groups. Japanese Patent Application Laid-Open No. 141390/81, for example, teaches the use of an ethylene copolymer having a number average molecular weight of 1,000 to 5,000 and containing 10 to 50% by weight of an ethylenically unsaturated ester and 6 to 15 alkyl branches per 100 methylene groups. These proposed modifying agents can effectively improve plugging resistance and flowability of middle distillate fuel oils with the difference between the 20% distillation temperature and the 90% distillation temperature being as broad as at least 100° C., but have no improving effect on the plugging resistance of middle distillate fuel oils with the above temperature difference being as relatively narrow as less than 100° C. although they can also improve the flowability of the oils having the relatively narrow distillation temperature difference.

Japanese Patent Publication No. 20069/64 teaches, for example, an ethylene copolymer having a number average molecular weight of 700 to 3,000 and containing 1 to 40% by weight of a vinyl ester. This copolymer can effectively act on middle distillate fuel oils having a narrow distillation temperature difference only by regulating its alkyl branches.

A typical example of the middle distillate fuel oils having a narrow distillation temperature difference is a light oil. To improve the plugging resistance of the light oil, it is the general practice to mix it with a kerosene fraction which has a lower boiling point. Such a method, however, is economically disadvatageous, and also leads to a reduction in the ratio of obtaining kerosene. Hence, it is not industrially advantageous.

SUMMARY OF THE INVENTION

In such a situation, any effective improver which can reduce plugging of a light oil having a narrow distillation temperature difference would be industrially very valuable.

With this background, the present inventors have made extensive investigations in order to solve this problem. These investigations have led to the discovery that when a middle distillate oil having a narrow distillation temperature difference is exposed to low temperatures, crystals of the wax begin to precipitate and the crystallization rapidly proceeds and leads to solidification of the oil, as compared with the case when a middle distillate oil having a broad distillation temperature difference is exposed to low temperatures.

This is because there is a very small difference between the temperature at which the precipitation of the crystals begins (cloud point) and the temperature at which the crystals plug the filter or solidify (the cold filter plugging point or the pour point). Based on this discovery, the present inventors thought that in the interaction between the wax and the flowability improver, a subtle balance between the solubility of the flowability improver in the oil and its ability to modify the wax crystals is more important. On the basis of this thought, the present inventors produced copolymers having various molecular structures and examined them, and endeavored to develop a flowability improver which effectively acts not only on middle distillate oils having a broad distillation temperature difference but also on middle distillate oils having a narrow distillation temperature difference. These efforts have led to the accomplishment of the present invention.

According to a first aspect, the present invention provides a fuel oil additive comprising an ethylenic copolymer, said copolymer being derived from
(a) ethylene, and
(b) at least one monomer selected from the group consisting of vinyl esters of saturated carboxylic acids, ethylenically unsaturated mono- or di-carboxylic acids, and esters thereof which are represented by the general formula:

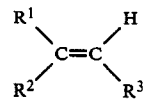

wherein $R^1$ represents hydrogen or a methyl group, $R^2$ represents the group $-OCOR^4$ or $-COOR^4$ in which $R^4$ represents hydrogen or an alkyl group having 1 to 18 carbon atoms, and $R^3$ represents hydrogen or the group $-COOR^4$ in which $R^4$ has the same significance as above, having a number average molecular weight of less than 1,000 and a (b) component content of 1 to 25 mol %, and containing 2 to 10 alkyl branches per 100 methylene groups According to a second aspect, the present invention provides a fuel oil having improved flowability and comprising a fuel oil and 10 to 2,000 ppm (i.e., $1 \times 10^{-3}$ to $2 \times 10^{-1}$%) by weight of the aforesaid copolymer based on the weight of the fuel oil.

The additive of this invention acts effectively on middle distillate fuel oils having a boiling range of 120° to 500° C. which include not only fuel oils having a difference between the 20% distillation temperature and the 90% distillation temperature of at least 100° C., but also fuel oils having this distillation temperature difference of less than 100° C. It improves both the flowability and plugging resistance of these oils.

DETAILED DESCRIPTION OF THE INVENTION

The invention will now be described in more detail.

Ethylene copolymer

The ethylene copolymer used in this invention is a copolymer derived from
(a) ethylene, and
(b) at least one monomer selected from the group consisting of vinyl esters of saturated carboxylic acids, ethylenically unsaturated mono- or di-carboxylic acids, and esters thereof (to be referred to as the monomer (b)) which are represented by the general formula:

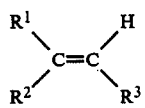

wherein $R^1$ represents hydrogen or a methyl group, $R^2$ represents the group $-OCOR^4$ or $-COOR^4$ in which $R^4$ represents hydrogen or an alkyl group having 1 to 18 carbon atoms, and $R^3$ represents hydrogen or the group $-COOR^4$ in which $R^4$ has the same significance as above.

Specific examples of the monomer (b) include vinyl acetate, vinyl propionate, vinyl butyrate, acrylic acid, methyl acrylate, ethyl acrylate, butyl acrylate, hexyl acrylate, 2-ethylhexyl acrylate, lauryl acrylate, stearyl acrylate, methacrylic acid, methyl methacrylate, ethyl methacrylate, butyl methacrylate, hexyl methacrylate, lauryl methacrylate, stearyl methacrylate, dimethyl maleate, diethyl maleate, dipropyl maleate, dimethyl fumarate, diethyl fumarate, and dipropyl fumarate.

The proportion of ethylene (a) in the copolymer is 75 to 99 mol %, and the proportion of the monomer (b) in the copolymer is 25 to 1 mol %. The content of the component (b) in the copolymer greatly affects the interaction of the copolymer with the wax, the solubility of the copolymer in the fuel oil, and the dispersibility of the precipitated wax, and is preferably 3 to 20 mol %, more preferably 7 to 18 mol %.

The molecular weight of the ethylenic copolymer used in this invention is less than 1,000 when measured by the vapor pressure osmometry (VPO). The molecular weight of the copolymer has closely to do with its solubility in fuel oils and its handlability.

The alkyl branches in the ethylenic copolymer used in this invention refer to terminal methyl moieties derived from the components (a) in the ethylenic copolymer (the terminal methyl moieties derived from the components (b) in the ethylenic copolymer are eliminated) and the number thereof, when measured by nuclear magnetic resonance, is 2 to 10, preferably 3 to 8, per 100 methylene groups. The alkyl branches greatly affect the interaction of the copolymer with the wax and the solubility of the copolymer in fuel oils.

When the copolymer of this invention is to be used as a flowability improver for a fuel oil, it is added in a weight proportion of 10 to 2,000 ppm (i.e., $1 \times 10^{-3}$ to $2 \times 10^{-1}$%), preferably 100 to 1,000 ppm (i.e., $1 \times 10^{-2}$ to $1 \times 10^{-1}$%), based on the weight of the fuel oil.

The copolymer may be directly added to the fuel oil. Alternatively, it may be added in the form of a concentrate prepared by dissolving it in kerosene, an aromatic solvent (such as benzene, toluene, xylene, etc.), or Cellosolve, for example, in a concentration of 10 to 50%.

The copolymer may be used alone as a fuel oil additive, or as required, it may be used in combination with other additives such as a pour point depressant, a corrosion inhibitor, an antioxidant, a water separating agent or a sludge preventing agent, as described, for example, in Japanese Patent Publication No. 23165/73.

Production of Copolymer

The copolymer of this invention can be produced by subjecting the required monomers as copolymerization conditions. It may be produced in a high-pressure polyethylene manufacturing apparatus.

(1) Catalyst

The copolymer used in this invention is produced by radical polymerization. Accordingly, the catalyst used in the production of this copolymer is a compound which generates a free radical.

Examples of the catalyst include oxygen; dialkyl peroxides such as di-t-butyl peroxide, t-butyl cumyl peroxide and dicumyl peroxide; diacyl peroxides such as acetyl peroxide, i-butyl peroxide and octanoyl peroxide; peroxy dicarbonates such as di-i-propylperoxy dicarbonate and di-2-ethylhexylperoxy dicarbonate; peroxy esters such as t-butylperoxy isobutyrate, t-butylperoxy pivalate and t-butylperoxy laurate; ketone peroxides such as methyl ethyl ketone peroxide and cyclohexanone peroxide; peroxy ketals such as 1,1-bis-t-butylperoxy cyclohexane and 2,2-bis-t-butylperoxy octane; hydroperoxides such as t-butyl hydroperoxide and cumene hydroperoxide; and azo compounds such as 2,2-azobisisobutyronitrile.

(2) Polymerization

Preferably, the polymerization is carried out by a continuous mode. As a polymerization reactor, there may be used a continuous stirred vessel-type reactor or a continuous tabular reactor which is generally used in the high pressure radical polymerization of ethylene.

The polymerization can be practiced by a single zone method using such a single reactor. It is possible, if desired, to use many reactors connected in series optionally with a condenser connected thereto, or to use a single reactor of which inside is divided effectively into some zones. According to the multiple reactor method or the multiple zone method, it is the usual practice to control the monomer composition, the catalyst concentration, the concentration of the molecular weight controlling agent, etc. in each of the reactor or in each of the reaction zones so that the properties of the resulting copolymer in each of the reactors or in each of the reaction zones may be controlled by providing differences in the reaction conditions used in the individual reactors or zones. When a plurality of reactors are connected in series, it is possible to use two or more vessel-type reactors or two or more tubular reactors, or to combine at least one vessel-type reactor with at least one tubular reactor.

The polymer formed in one or more reactors may be separated from the unreacted monomers and treated as in the usual production of high-pressure polyethylene. A mixture of the unreacted monomers is mixed with additional amounts of the same monomers. The mixture is again pressurized and re-cycled to the reactor. The additional amounts of the monomers to be added as above have such a composition as to adjust the composition of the mixture to the composition of the original feed. Generally, the additional amounts of the monomers have a composition nearly equivalent to the composition of the polymer separated from the polymerzation vessel. In this case, the reactor is preferably of a vessel-type in order to obtain a copolymer having a uniform composition.

The catalyst is usually dissolved in a solvent having a poor chain transfer effect and introduced into the reactor directly by a high pressure pump. Its concentration is desirably about 0.5 to 30% by weight, preferably 1 to 25% by weight, based on the total weight of the reaction mixture.

Suitable solvents include, for example, hexane, heptane, white spirit, parafine oils, cyclohexane, toluene, higher branched saturated aliphatic acid hydrocarbons, and mixtures of these solvents.

In high-pressure radical polymerization, chain transfer agents are generally used for controlling the molecular weight of polymer.

All chain transfer agents which are used in ordinary high pressure radical polymerization can be used in this invention. Examples are alkanes such as ethane, propane, butane, hexane and heptane, alkenes such as propylene, butene and hexene, alcohols such as ethanol, methanol and propanol, ketones such as acetone and methyl ethyl ketone, and aldehydes such as acetaldehyde and propionaldehyde. Many other chain transfer agents used in the high pressure process are also feasible in this invention.

A gaseous chain transfer agent is introduced into the intake side of a compressor, and a liquid one is introduced into the reaction system by a pump.

(3) Polymerization conditions (A) Polymerization pressure

The polymerization pressure to be employed exceeds 500 kg/cm$^2$ (i.e., 49.0 MPa), preferably 1,000 to 4,000 kg/cm$^2$ (i.e., 98.1 to 392.3 MPa).

(B) Polymerization temperature

The polymerization temperature is at least 120° C., preferably 150° to 300° C.

(4) Other items

The copolymer of this invention produced in the reactor is separated from the monomers in accordance with a customary procedure of the high pressure radical polymerization method, and becomes a product. The product may be used as such. If desired, it may be subjected to various post-treatment steps used for products already obtained by high pressure radical polymerization.

The following examples illustrate the present invention more specifically without any intention of limiting the invention thereby.

The qualities of the copolymers obtained in these examples were evaluated by the following methods.

(1) Cold filter plugging point (CFPP for short): in accordance with British Standards IP-309.

(25 2) Pour point (PP for short): in accordance with JIS K-2269 (Japanese Industrial Standards).

First, examples of producing the various copolymers used in the following Examples and Comparative Examples are shown.

PRODUCTION EXAMPLE 1

(Copolymer Ia)

A 1.5-liter stirred autoclave-type continuous reactor was charged continuously with 32 kg/hr of ethylene, 17.5 liters/hr of vinyl acetate (VA), 8.3 liters/hr of a solution of propionaldehyde in ethyl acetate in a concentration of 500 g/liter, and 0.44 liter/hr of a solution of t-butylperoxy isobutyrate as a catalyst in n-hexane in a concentration of 15 g/liter, and polymerization was carried out at a temperature of 220° C. under a pressure of 1,500 kg/cm$^2$ (i.e., 147.1 MPa) to form a copolymer Ia. The resulting copolymer Ia had a molecular weight of 800 and a VA content of 10.5 mol % and contained 6.2 alkyl branches per 100 methylene groups (C).

PRODUCTION EXAMPLE 2

(Copolymer Ib)

By the same method as in Production Example 1, a copolymer Ib having a different molecular structure was produced.

The reaction was continuously charged with 32 kg/hr of ethylene, 27.5 liters/hr of VA, 7.5 liters/hr of a solution of propionaldehyde in ethyl acetate in a concentration of 500 g/liter, and 0.35 liter/hr of a solution of t-butylperoxy isobutyrate as a catalyst in n-hexane in a concentration of 15 g/liter, and polymerization was carried out at a temperature of 220° C. under a pressure of 1,500 kg/cm$^2$ (i.e., 147.1 MPa). The resulting copolymer Ib had a molecular weight of 900 and a VA content of 17.5 mol % and contained 5.5 alkyl branches per 100C.

PRODUCTION EXAMPLE 3

(Copolymer IIa)

By the same method as in Production Example 1, a copolymer IIa having a different molecular structure was produced.

The reactor was continuously charged with 32 kg/hr of ethylene, 17.5 liters/hr of VA, 18.8 kg/hr of propylene, 6.0 liters/hr of a solution of propionaldehyde in ethyl acetate in a concentration of 500 g/liter, and 2.1 liters/hr of a solution of t-butylperoxy isobutyrate as a catalyst in n-hexane in a concentration of 150 g/liters, and polymerization was carried out at a temperature of 218° C. under a pressure of 1,500 kg/cm$^2$ (i.e., 147.1 MPa). The resulting copolymer IIa had a molecular weight of 800 and a VA content of 10.6 mol % and contained 12.5 alkyl branches per 100C.

PRODUCTION EXAMPLE 4

(Copolymer IIb)

By the same method as in Production Example 1, a copolymer IIb having a different molecular structure was produced.

The reactor was continuously charged with 32 kg/hr of ethylene, 18 liters/hr of VA, 2,100 liters/hr of 1-butane and 0.6 liter/hr of a solution of t-butylperoxy pivalate as a catalyst in n-hexane in a concentration of 120 g/liter, and polymerization was carried out at a temperature of 200° C. under a pressure of 1,500 kg/cm$^2$ (i.e., 147.1 MPa). The resulting copolymer IIb had a molecular weight of 3,300 and a VA content of 12 mol % and contained 5.2 alkyl branches per 100 C.

PRODUCTION EXAMPLE 5

(Copolymer Ic)

By the same method as in Production Example 1, a copolymer Ic was produced using methyl acrylate (MA) instead of VA as a comonomer.

The reactor was continuously charged with 32 kg/hr of ethylene, 1.9 liter/hr of MA, 8.5 liters/hr of a solution of propionaldehyde in ethyl acetate in a concentration of 500 g/liter and 0.5 liter/hr of a solution of t-butylperoxy isobutyrate as a catalyst in n-hexane in a concentration of 15 g/liter, and polymerization was carried out at a temperature of 221° C. under a pressure of 1,500 kg/cm² (i.e., 147.1 MPa). The resulting copolymer Ic had a molecular weight of 850 and a MA content of 11 mol % and contained 6.0 alkyl branches per 100C.

The fuel oils used in the following examples were a fuel oil A having a broad distillation temperature difference and a fuel oil B having a narrow distillation temperature difference. Their properties are shown in Table 1.

TABLE 1

| Properties | Fuel Oil A | Fuel Oil B |
|---|---|---|
| Distillation Temperature (°C.) | | |
| Initial Boiling Point (I.B.P.) | 176 | 201 |
| 20% | 240 | 260 |
| 50% | 289 | 285 |
| 90% | 342 | 345 |
| End Point (E.P.) | 372 | 369 |
| Pour Point (PP) (°C.) | −5 | −5 |
| Cold Filter Plugging Point (CFPP) (°C.) | −6 | −3 |

EXAMPLES 1 to 3 and COMPARATIVE EXAMPLES 1 and 2

Each of the copolymers obtained in Production Examples 1 to 5 was dissolved in kerosene in a concentration of 30% by weight to form a concentrate. The concentrate was added to each of the fuel oils A and B as shown in Table 1 in such an amount that the weight proportion of the copolymer was 300 ppm (i.e., $3 \times 10^{-2}\%$) based on the weight of the fuel oil. The pour points (PP) and cold filter plugging points (CFPP) of the resulting modified fuel oils were measured, and the results are shown in Table 2.

TABLE 2

| Example or Comparative Example | Additive | Fuel Oil A CFPP (°C.) | Fuel Oil A PP (°C.) | Fuel Oil B CFPP (°C.) | Fuel Oil B PP (°C.) |
|---|---|---|---|---|---|
| | None | −6 | −5 | −3 | −5 |
| Example 1 | Copolymer Ia | −15 | −22.5 | −11 | −20 |
| Example 2 | Copolymer Ib | −14 | −25 | −11 | −22.5 |
| Comparative Example 1 | Copolymer IIa | −11 | −22.5 | −3 | −17.5 |
| Comparative Example 2 | Copolymer IIb | −15 | −22.5 | −2 | −17.5 |
| Example 3 | Copolymer Ic | −13 | −20 | −9 | −17.5 |

The results given in Table 2 demonstrate that with regard to middle distillate fuel oils having a boiling range of 120° to 500° C., the additives of this invention act effectively not only on the fuel oil A whose difference between the 20% distillation temperature and the 90% distillation temperature is more than 100° C. but also on the fuel oil B whose difference of these temperature is less than 100° C. and improve the flowability of the fuel oils and greatly improve their filter plugging resistance.

While the invention has been described in detail and with reference to specific embodiments thereof, it will be apparent to one skilled in the art that various changes and modifications can be made therein without departing from the spirit and scope thereof.

What is claimed is:

1. A middle distillate fuel oil having a difference between a 20% and 90% distillation temperature of less than 100° C. and having improved flowability, consisting essentially of a fuel oil and 10 to 2,000 ppm by weight, based on the weight of the fuel oil, of a flowability improver consisting essentially of an ethylenic copolymer being derived from:
   (a) ethylene, and
   (b) at least one monomer selected from the group consisting of vinyl esters of saturated carboxylic acids, ethylenically unsaturated mono- or di-carboxylic acids and esters thereof having the formula:

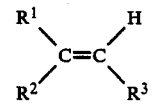

wherein $R^1$ represents hydrogen or a methyl group, $R^2$ represents the group $-OCOR^4$ or $-COOR^4$ in which $R^4$ represents hydrogen or an alkyl group having 1 to 18 carbon atoms, and $R^3$ represents hydrogen or the group $-COOR^4$ in which $R^4$ is as defined above, and having a number average molecular weight of less than 1,000 and a (b) component content of 1 to 25 mol %, and containing 2 to 10 alkyl branches per 100 methylene groups.

2. The fuel oil as claimed in claim 1, wherein the proportion of the copolymer is 100 to 1,000 ppm.

3. The fuel oil as claimed in claim 1, wherein the copolymer has a (b) component content of 3 to 20 mol %.

4. The fuel oil as claimed in claim 1 wherein the copolymer has a (b) component content of 7 to 18 mol %.

5. The fuel oil as claimed in claim 1, wherein said fuel oil is a middle distillate fuel oil having a boiling range of 120° to 500° C., with the difference between a 20% distillation temperature and a 90% distillation temperature being as narrow as less than 100° C.

6. The fuel oil as claimed in claim 5, wherein $R^1$ and $R^3$ each represents hydrogen and $R^2$ represents the group $-OCOCH_3$ or $-COOCH_3$.

7. The fuel oil as claimed in claim 5, wherein $R^1$ and $R^3$ each represents hydrogen and $R^2$ represents the group $-OCOCH_3$.

8. The fuel oil as claimed in claim 6, wherein the copolymer has a (b) component content of 7 to 18 mol %.

9. The fuel oil as claimed in claim 8, wherein the proportion of the copolymer having a (b) component content of 7 to 18 mol % is 100 to 1,000 ppm.

* * * * *